(12) United States Patent
Vago

(10) Patent No.: US 7,624,703 B2
(45) Date of Patent: Dec. 1, 2009

(54) METHOD AND DEVICE FOR REMOVAL OF AMMONIA AND OTHER CONTAMINANTS FROM RECIRCULATING AQUACULTURE TANKS

(76) Inventor: Robert Edward Vago, 1196 Mallard Marsh Dr., Osprey, FL (US) 34229

( * ) Notice: Subject to any disclaimer, the term of this patent is extended or adjusted under 35 U.S.C. 154(b) by 499 days.

(21) Appl. No.: 11/534,008

(22) Filed: Sep. 21, 2006

(65) Prior Publication Data

US 2007/0032828 A1 Feb. 8, 2007

Related U.S. Application Data

(63) Continuation-in-part of application No. 11/042,607, filed on Jan. 25, 2005, now Pat. No. 7,393,323.

(60) Provisional application No. 60/719,616, filed on Sep. 22, 2005.

(51) Int. Cl.
A01K 81/00 (2006.01)
(52) U.S. Cl. ............... 119/215; 119/201; 119/216; 119/218; 119/219; 119/223; 119/226; 119/227; 119/228; 119/230; 119/231; 119/232
(58) Field of Classification Search ................ 601/2–4; 600/407, 437; 119/201, 215, 230, 231; 366/127, 366/101, 108, 114, 347, 116; 422/128
See application file for complete search history.

(56) References Cited

U.S. PATENT DOCUMENTS

| RE31,779 E | 12/1984 | Alliger |
|---|---|---|
| 4,942,868 A | 7/1990 | Vago |
| 5,048,520 A | 9/1991 | Vago |
| 5,178,134 A | 1/1993 | Vago |
| 5,305,737 A | 4/1994 | Vago |
| 5,523,058 A | 6/1996 | Umemura et al. |
| 5,665,141 A | 9/1997 | Vago |
| 5,694,936 A | 12/1997 | Fujimoto et al. |
| 6,036,644 A | 3/2000 | Schutt |
| 6,206,843 B1 | 3/2001 | Iger et al. |
| 6,382,134 B1 * | 5/2002 | Gruenberg et al. .......... 119/215 |

(Continued)

FOREIGN PATENT DOCUMENTS

WO 2006/017561 A2 2/2006

OTHER PUBLICATIONS

Kenneth S. Suslick "The Chemical and Physical Effects of Ultrasound"; Summary of Sonochemistry and Sonoluminescence, Research Group Chemistry; pp. 1-10; 2006.

(Continued)

Primary Examiner—Brian Casler
Assistant Examiner—Baisakhi Roy
(74) Attorney, Agent, or Firm—Buchanan Ingersoll & Rooney PC

(57) ABSTRACT

A method for reducing ammonia concentration in an aqueous medium caused by the presence of fish gill/urine discharge, fish faeces and uneaten organic fish-feed particulate matter in recirculating aquaculture tanks. Fish in fish tank water are remotely located or partially isolated from the fish tank water utilized by the sono-molecular-conversion apparatus. Transient cavitation-created, collapsing microsized bubbles generated in the fishless portion of the fish tank water completes ammonia nitrification, mineralization and denitrification therein.

26 Claims, 7 Drawing Sheets

PARTIALLY ISOLATED NITRIFICATION MINERALIZATION AND DENITRIFICATION

U.S. PATENT DOCUMENTS

| | | | |
|---|---|---|---|
| 6,395,096 | B1 | 5/2002 | Madanshetty |
| 6,476,622 | B1 | 11/2002 | Robinson, Jr. |
| 6,719,449 | B1 | 4/2004 | Laugharn, Jr. et al. |
| 6,863,826 | B2* | 3/2005 | Sheets .................. 210/705 |
| 6,948,843 | B2* | 9/2005 | Laugharn et al. ............ 366/127 |
| 7,008,538 | B2* | 3/2006 | Kasparian et al. ........... 210/610 |
| 7,422,680 | B2* | 9/2008 | Sheets, Sr. ................... 210/143 |
| 2004/0049134 | A1 | 3/2004 | Tosaya et al. |
| 2005/0017599 | A1 | 1/2005 | Puskas |
| 2005/0038361 | A1 | 2/2005 | Zhong et al. |
| 2005/0075587 | A1 | 4/2005 | Vago |
| 2005/0143638 | A1 | 6/2005 | Johnson et al. |
| 2005/0150830 | A1* | 7/2005 | Laugharn et al. ............ 210/634 |
| 2006/0009693 | A1 | 1/2006 | Hanover et al. |
| 2006/0009696 | A1 | 1/2006 | Hanover et al. |
| 2006/0021642 | A1 | 2/2006 | Sliwa, Jr. et al. |
| 2006/0158956 | A1 | 7/2006 | Laugharn, Jr. et al. |
| 2007/0167880 | A1 | 7/2007 | Vago |
| 2007/0167983 | A1 | 7/2007 | Vago |

OTHER PUBLICATIONS

USPTO Search ABST/(Ammonia and Nitrification); pp. 1-2.

70 pages of Google Search (Ammonia and Nitrification).

Brennen, Christopher-Earls; "Quality Control of Disinfection in Ultrasonic Baths" 1995, Oxford University Press ; Chapters 1-4.

Philip Lymbery "The Welfare of Farmed Fish"; May 1992; pp. 1-27.

K.F. Graff "A History of Ultrasonics"; Chapter 1 of "Physical Acoustics"; vol. 15, Mason and Thurston; Academic Press; 1981.

National Academy Press; "Long Range Options: Advanced Method for Handling Liquid Waste"; 1996; pp. 1-8.

James B. Duncan, Ph.D "Bonneville Power Administration FY 2001 Innovative Project Proposal Review"; 2001; pp. 1-8.

Dana Stone "Dealing With a Toxic Threat"; News in Engineering, The Ohio State University College of Engineering; vol. 71, No. 3; Dec. 1999, pp. 1-3.

Svein Vagle "On the Impact of Underwater Pile-Driving Noise on Marine Life"; Ocean Science and Productivity Division; Institute of Ocean Sciences; DFO/PACIFIC; Feb. 2003; pp. 1-41.

G. Scherba et al. "Quantitative Assessment of the Germicidal Efficacy of Ultrasonic Energy"; Department of Veterinary Pathobiology; Department of Electrical and Computer Engineering, University of Illinois; Applied and Environmental Microbiology; Jul. 1991; 1991-American Society for Microbiology pp. 2079-2084.

William D. O'Brien, Jr., Ph.D, et al. "Mouse Lung Damage From Exposure to 30 kHz Ultrasound"; Ultrasound in Medicine and Biology, 1994; pp. 1-24.

William D. O'Brien, Jr., et al. "Comparison of Mouse and Rabbit Lung Damage Exposure to 30 kHz Ultrasound"; Ultrasound in Medicine and Biology, 1994; vol. 2, No. 3; pp, 299-307.

William D. O'Brien, Jr., et al. "Rabbit and Pig Lung Damage Comparison From Exposure to Continuous Wave 30 kHz Ultrasound"; Ultrasound in Medicine and Biology, 1996; vol. 22, No. 3; pp. 345-353.

Graph, Watts/cm2 vs. Frequency—mHz; Graph Modified From Esche, 1952.

O.I. Babikov; "Cavitation Energy vs. Viscosity", Ultrasonics And Its Industrial Application; Translated from the Russian Consultants Bureau; 1960.

H. Schöne et al.; "Quality Control of Disinfection in Ultrasonic Baths"; TU Hamburg-Harburg Reports on Sanitary Engineering 35; 2002; Ultrasound in Environmental Engineering II, pp. 1-8.

Scientific American; Feb. 1989; pp. 84.

Louis A. Helfrich et al. Fish Farming in Recirculating Aquaculture Systems (RAS); Department of Fisheries and Wildlife Sciences; Virginia Tech; pp. 1-15.

Dr. Ying Q. Ji et al., "Evaluation of Recirculating Aquaculture Systems"; Minnesota Department of Agriculature and the University of Minnesota; Oct. 1997; pp. 1-33.

International Search Report issued in a corresponding PCT application, dated Nov. 14, 2005.

International Search Report issued in a corresponding PCT application, dated Aug. 15, 2006.

* cited by examiner

FIGURE 1 PARTIALLY ISOLATED NITRIFICATION MINERALIZATION AND DENITRIFICATION

FIGURE 2, REMOTELY LOCATED NITRIFICATION MINERALIZATION AND DENITRIFICATION

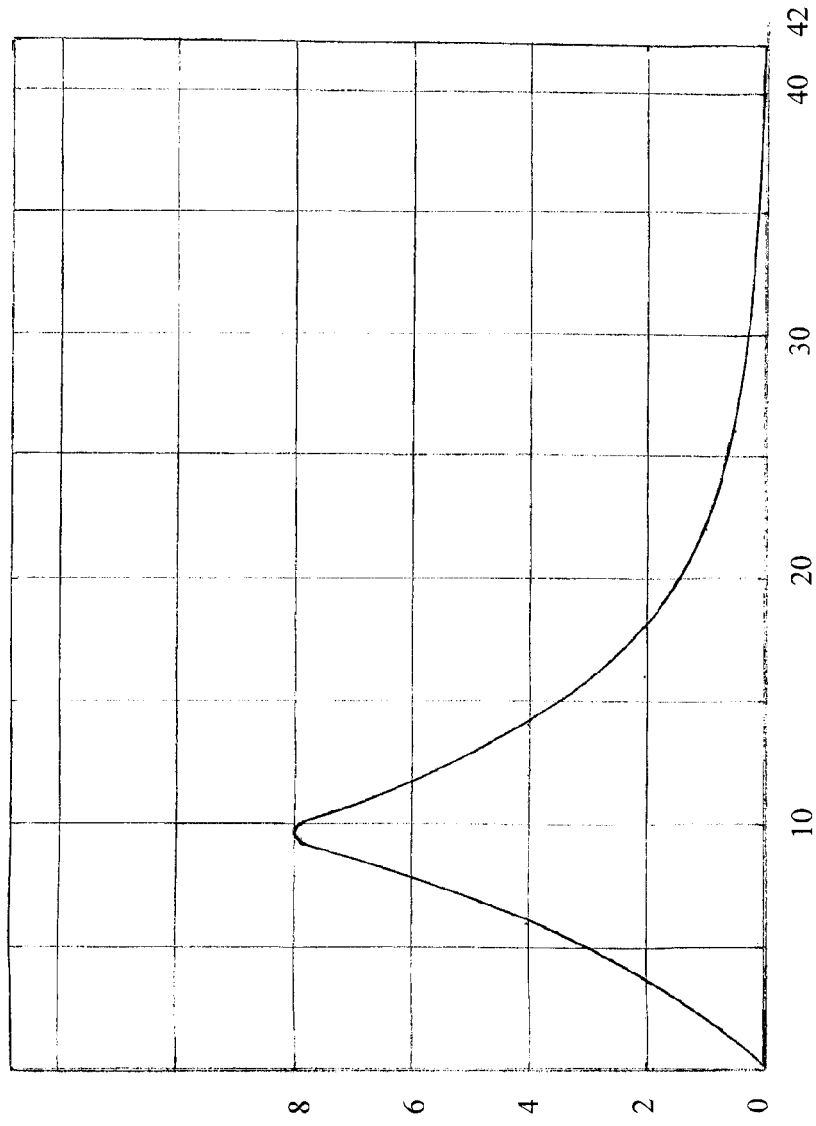

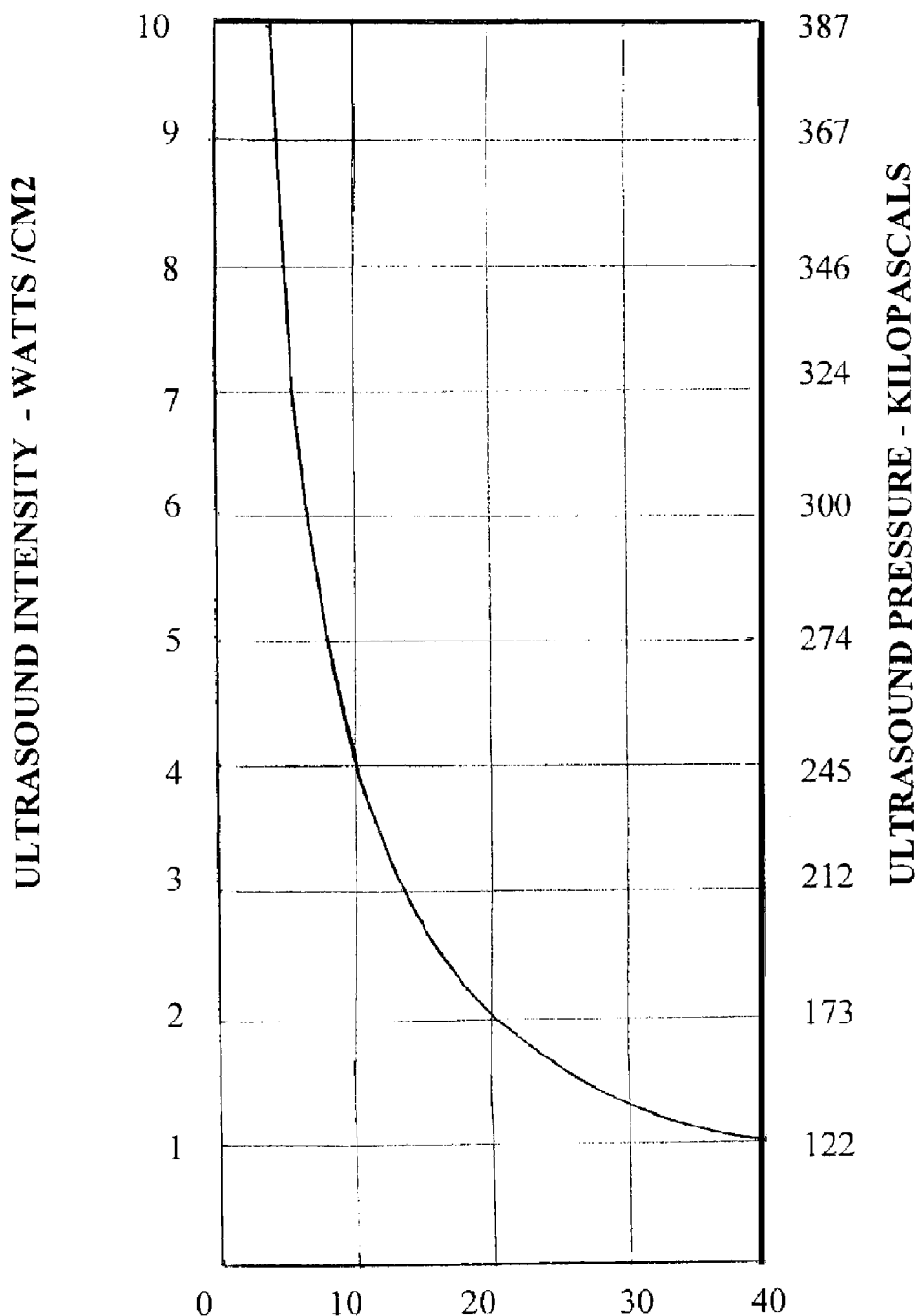
SONO-MOLECULAR-CONVERSION PROCESS
DURATION IN HOURS
FIGURE # 7

METHOD AND DEVICE FOR REMOVAL OF AMMONIA AND OTHER CONTAMINANTS FROM RECIRCULATING AQUACULTURE TANKS

CROSS-REFERENCE TO RELATED APPLICATIONS

The present application claims the benefit under 35 USC 119(e) of U.S. Provisional Patent Application No. 60/719,616, filed Sep. 22, 2005. The present application is also a continuation-in-part of U.S. Ser. No. 11/042,607, filed in the U.S. on Jan. 25, 2005 now U.S. Pat. No. 7,393,323.

FIELD OF THE INVENTION

This invention relates to a non-bacterial method and device for detoxification of ammonia produced from fish-gills, fish-urine/faeces and ammonia mineralized from organic fish-food.

BACKGROUND OF THE INVENTION

According to the Department of Fisheries and Wildlife Sciences, Virginia Tech., detoxification of ammonia occurs in biofilters through the process of nitrification.

Nitrification refers to the bacterial conversion of ammonia nitrogen (NH4/NH3) to the less toxic NO2 and finally to "non-toxic" NO3.

The bacterial nitrification process requires a suitable surface on the biofilter upon which the bacteria grow (biofilter media) pumping a continuous flow of tank-water through the biofilter and maintaining normal water temperature and good water quality.

Two groups of aerobic (oxygen requiring) nitrifying bacteria are needed. Nitrosomonas bacteria convert NH4/NH3 to NO2 (they oxidize toxic ammonia excreted by fish-gills/urine and excreta into less toxic nitrite). The nitrobacter bacteria convert NO2 to NO3 (they oxidize nitrite to largely non-toxic nitrate).

Bacterial nitrification is an aerobic process which requires oxygen. For every 1 mg of ammonia converted 5 mg of dissolved oxygen is consumed and an additional 5 mg of dissolved oxygen is required to satisfy the oxygen demand of the bacteria involved with the conversion. Therefore, tanks with large numbers of fish and heavy ammonia loads will require plenty of oxygen before and after the biofilter process.

Bacterial nitrification is an acidifying process, but is most efficient when the water pH is maintained between 7 and 8 and the water temperature is about 27-28 C. Acid water, (less than pH 6.5) inhibits bacterial nitrification and should be avoided. Soft, acidic waters may require addition of carbonates (calcium carbonate, sodium bicarbonate) to buffer the water.

Biofilters consist of actively growing bacteria attached to surfaces. Biofilters can fail if the bacteria die or are inhibited by natural aging, toxicity from chemicals, (for example, fish disease treatment), lack of oxygen, low pH. Biofilters, are designed so that aging cells can be sloughed off to create space for active new bacterial growth. However, there are situations, (e.g., cleaning too vigorously) where all bacteria are removed, or if chemical addition to tank water to fight fish disease results in biofilter failure then the water in the system should be exchanged. The biofilter would then have to be reactivated (taking 3 to 4 weeks) and the water pH adjusted to optimum levels.

Activating a new biofilter, (i.e., developing a healthy population of nitrifying bacteria capable of removing ammonia and nitrite produced at normal feeding rates) requires one to three months. Many fish die during this period of biofilter activation.

OBJECTS AND SUMMARY

An object of the present invention is to provide an improved method and apparatus for reducing ammonia concentrations caused in tank water by the presence of fish gill/urine discharge, fish faeces and uneaten organic fish food particulate matter.

Another object of the invention is to substitute a sono-molecular-conversion process for bacterial oxidation to accomplish nitrification and mineralization processes thereby eliminate or reduce the need for:

the aforementioned bacterial dissolved oxygen demand, periodic bacteria replacement and ensuing production delay, water buffering to maintain the bacterial pH range requirement eliminating the bacteria water temperature range control requirement, and initial nitrification start-up time-delay.

It is another object for some embodiments of the present invention to reduce ammonia to nitrite conversion output by a factor of at least 80.

Another object of the invention is compatibility with the sonochemical germicidal, pollutant conversion and humane fish slaughter invention attributes described and claimed in, U.S. patent applications Ser. Nos. 10/676,061, 10/912,608, 11/042,607, which are hereby incorporated herein by reference.

One embodiment of the present invention relates to a method of reducing ammonia concentration in tank water caused by the presence of fish-gill/urine discharge, fish faeces and ammonia generated from organic to inorganic mineralization of uneaten fish food particulate. The method is based on the considerable research carried out by the inventor in the field of low frequency ultrasound with respect to transient cavitation bubble collapse, wherein, very high temperatures (5,500 C) and pressures (several hundred atmospheres) cause organic compounds in the vicinity of the bubble-collapse to be degraded and inorganic compounds reduced or undergo molecular rearrangement.

Detoxification of ammonia, as for oxygenation of tank water, is essentially, a continuous (24/7), ongoing process. The sono-molecular-conversion intensity control means may be manual or automatic, as preferred. When automatic, detoxification takes place under microprocessor control. When manual, the operator adjusts the sono-molecular-conversion control as indicated by ammonia concentration monitors.

BRIEF DESCRIPTION OF DRAWINGS

FIGS. 5 and 6 illustrate the results of ammonia mineralization experiments.

FIG. 7 illustrates the timing of nitrification.

DETAILED DESCRIPTION OF THE PREFERRED EMBODIMENTS

Figure 1:
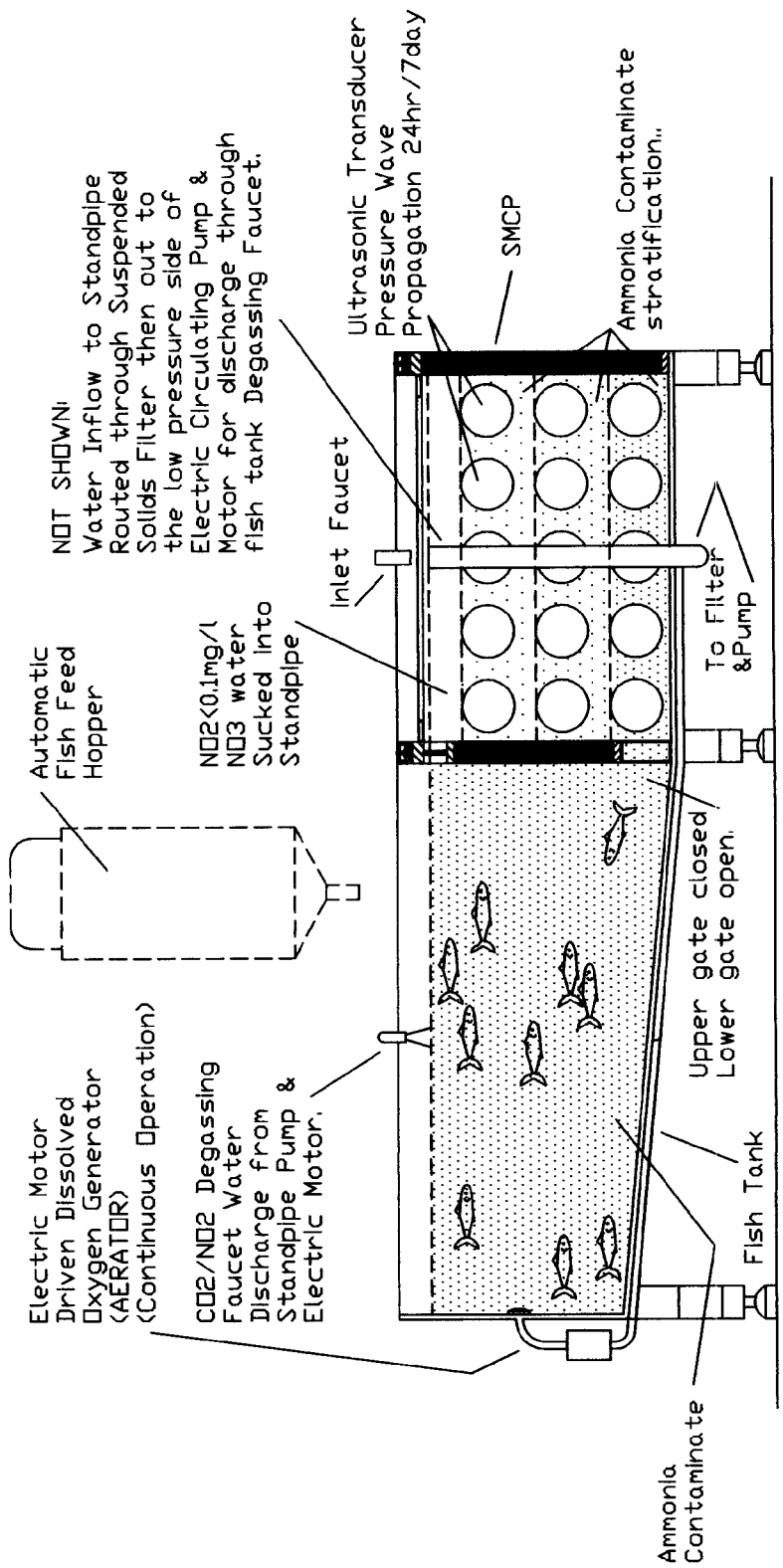
FIG. 1 illustrates a recirculating aquaculture tank and attached sono-molecular-conversion device configuration suited to a serial mass production objective, whereby a series of these device configurations are connected together to enable the automatic transfer of fish from one recirculating tank to another as the fish graduate in size from fingerling to market size. The essential functions of such an aquaculture tank configuration are described by FIG. 1.
Figure 2:
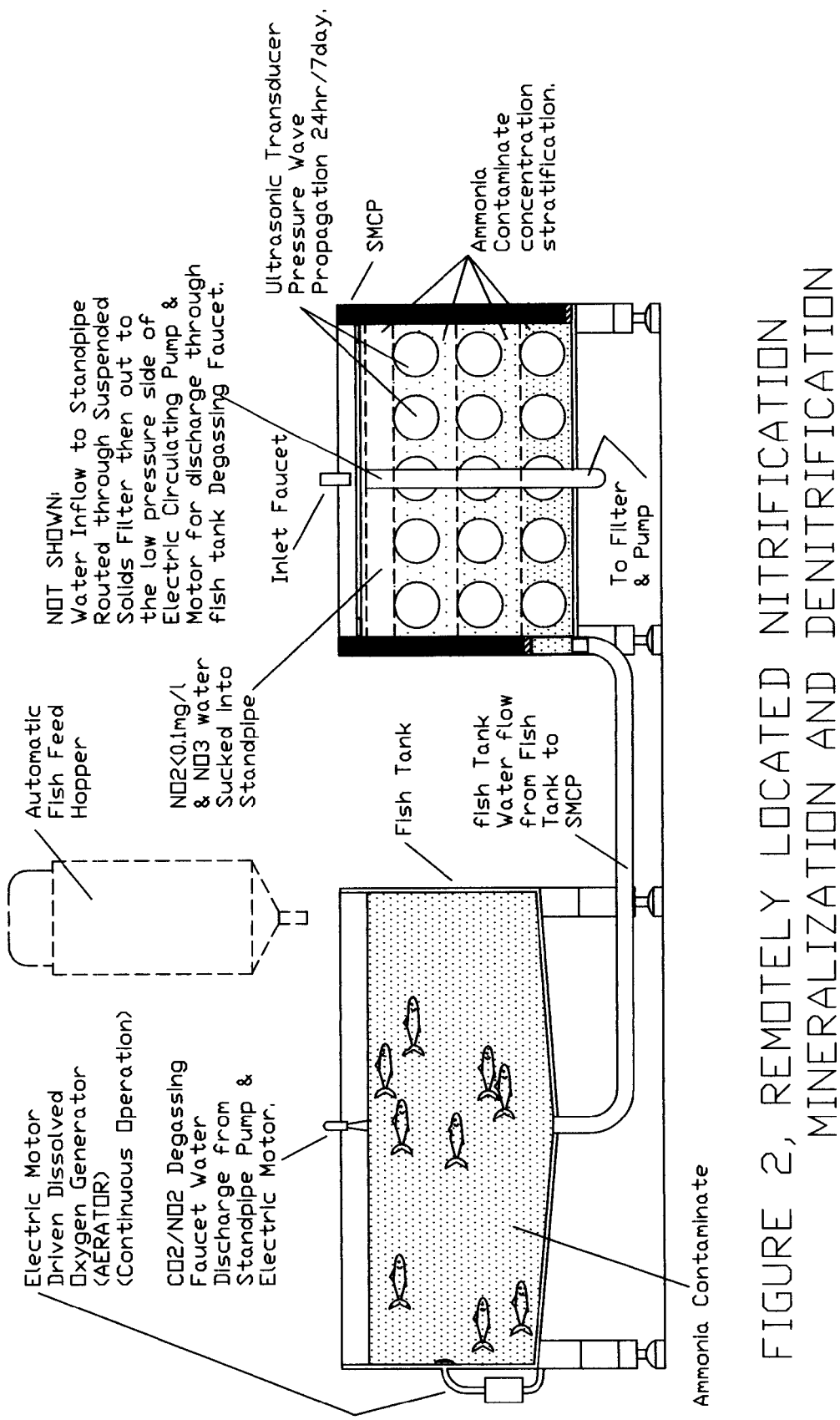
FIG. 2 illustrates an aquaculture tank and remotely located sono-molecular-conversion device suited to after-market applications whereby existing recirculating aquaculture

Based on the experimentation data set forth below, an embodiment of the present invention includes a sono-molecular-conversion apparatus that has a stand-alone console housing, an ultrasound powered tank, input/output water ports, an outlet delivery pump and a particulate filtration system illustrated in FIGS. 1 and 2. Water contaminated with ammonia and uneaten food particulate is extracted from the recirculating aquaculture system (RAS) and subjected to sono-molecular-conversion to reduce ammonia concentration to the region of 0.1 mg/L or less before being fed back through a particulate matter filtration system to the RAS. This is a continuous 24/7 ammonia conversion process. The RAS water tanks are equipped with ammonia sensors at their water input and outlet ports.

In the automatic ammonia sensing version, signal outputs from both ammonia sensors are fed to a microprocessor which adjusts the sono-molecular-conversion intensity amplitude to keep the required rate of ammonia reduction fed back to the RAS within specified limits.

In the manual version the operator is provided with a manual sono-molecular-conversion control which is adjusted in correspondence with the ammonia concentration indicated by the input and output ammonia concentration gauges.

Based upon its minimal usage of dissolved oxygen and negligible increase in pH the Sono-Molecular-Conversion Process, (SMCP) is the preferred decontaminant removal system when compared to the, state-of-the-art, Recirculating Aquaculture System, (RAS), biofilter (bacteria), used to effect ammonia nitrification and inorganic fish-food mineralization and partial denitrification.

With a biofilter, autotrophic nitrosomonas bacteria and nitrobacter bacteria respectively convert ammonia to nitrite then nitrite to nitrate.

With a biofilter, heterotrophic bacteria effect mineralization to convert organic matter such as fish-food into inorganic ammonia through removal of its carbon content.

With a biofilter, partial denitrification, (disassimalation) is effected by heterotrophic bacteria which change nitrate to nitrite and ammonia.

A major technological difference between the Biofilter and the Sono-molecular-conversion processes is that the former relies upon bacterial digestive oxidation processes of living aerobic and anaerobic organisms while the latter relies upon the sono-molecular-conversion process initiated by transient cavitation collapse of microsized bubbles.

Sono-Molecular-Conversion Nitrification

The inventor's experimentation, has demonstrated the following interrelationships associated with sono-molecular-conversion, ammonia (NH4/NH3) nitrification.

Ammonia/water mixtures were irradiated with ultrasound pressure waves having a frequency of 30 kHz and intensity settings of 2.0, 1.5, and 1.0 W/cm2. The corresponding pressure amplitudes were, respectively, 212 kPa, 150 kPa, and 100 kPa. The ammonia/water concentrations were 2.0, 4.0, 8.0, and 250 mg/L. The water sources, variably experimented with, were Municipal, Spring and Distilled.

Figure 3:
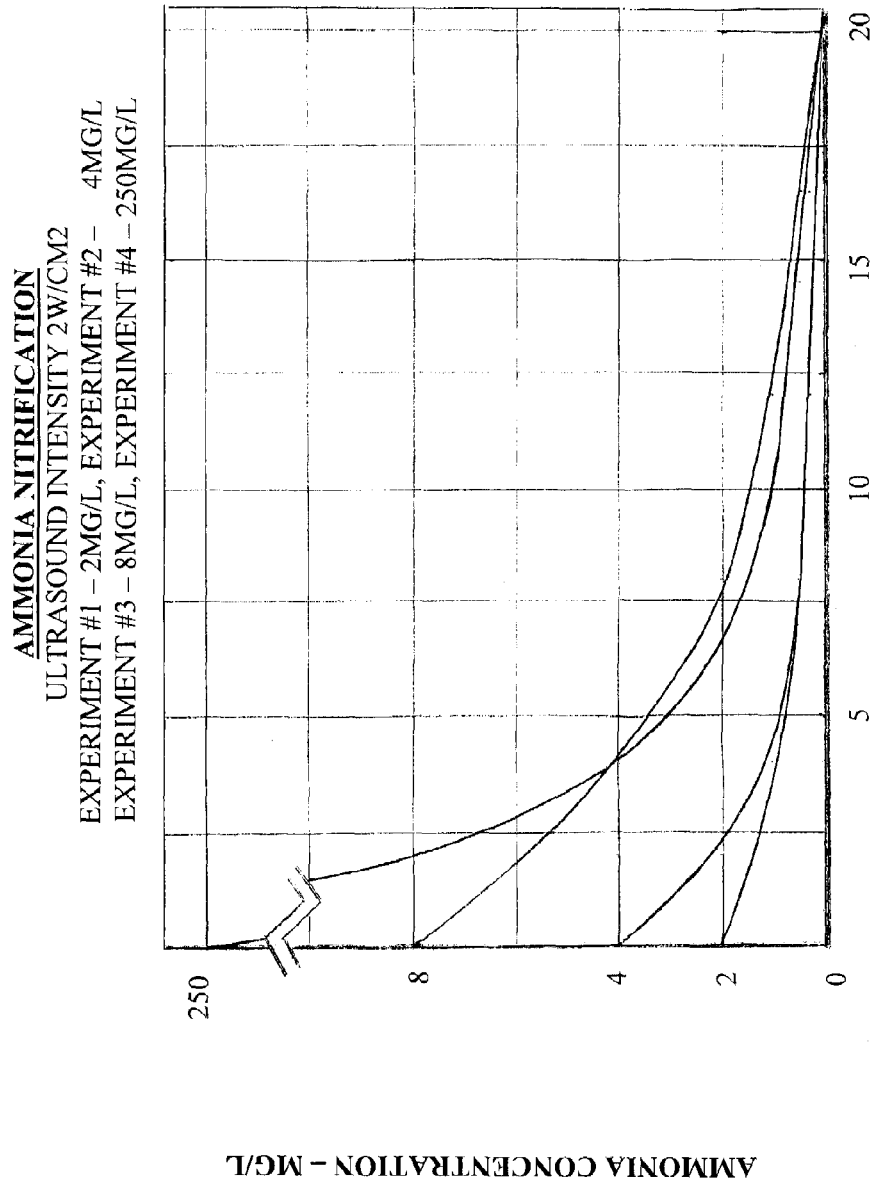
FIGS. 3 and 4 illustrate the results of ammonia nitrification experiments.
Figure 4:
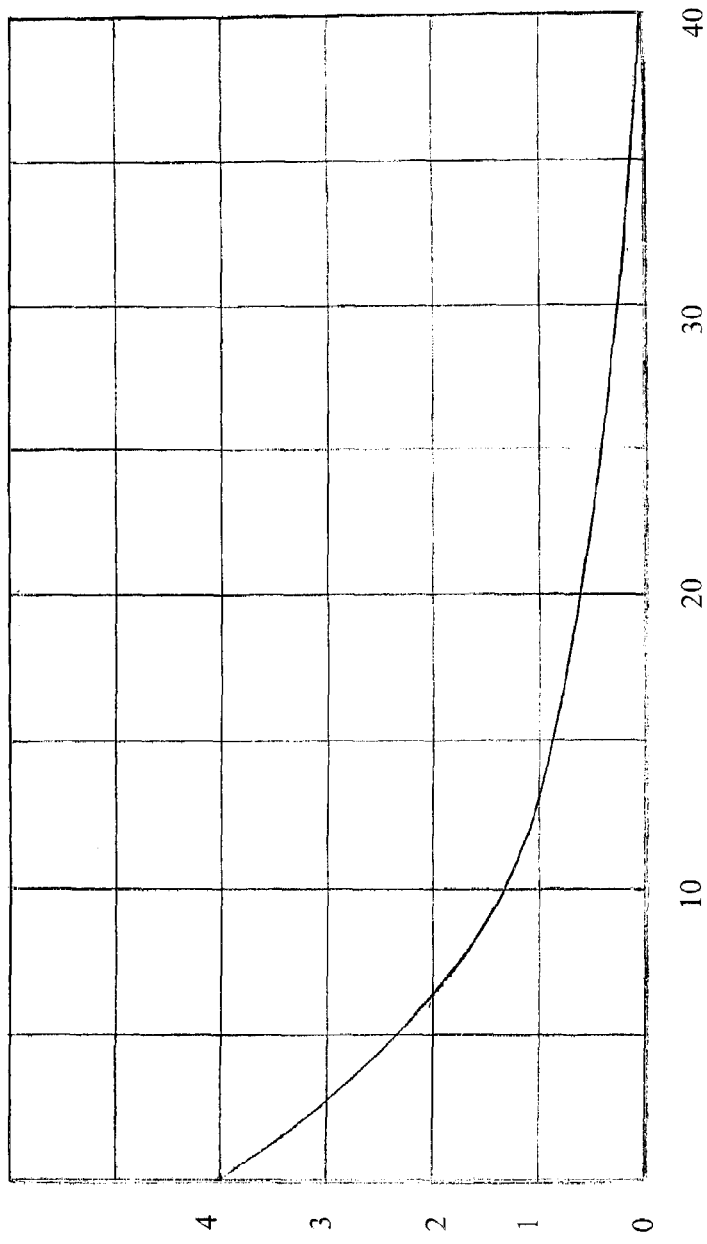

FIGS. 3 and 4 and the following tables illustrate the results of the experiments.

EXPERIMENT # 1 - Nitrification
Results Summary Table - (see FIG. 3)

| Status | pH | DO | NH3/NH4 | NO2 | NO3 | INTENSITY | TIME |
|---|---|---|---|---|---|---|---|
| Start | 7.6 | 9.5 mg/l | 2 mg/l | 0 mg/l | <5 mg/l | 2 W/cm2 | 0 Hrs |
| Finish | 7.6 | 9.5 mg/l | 0 mg/l | <0.5 mg/l | 10 mg/l | 2 W/cm2 | 21 Hrs |

EXPERIMENT # 2 - Nitrification
Result Summary Table - (see FIG. 3)

| Status | pH | DO | NH3/NH4 | NO2 | NO3 | INTENSITY | TIME |
|---|---|---|---|---|---|---|---|
| Start | 7.6 | 10 mg/l | 4 mg/l | 0 mg/l | 5 mg/l | 2 W/cm2 | 0 Hrs |
| Finish | 7.6 | 8 mg/l | 0 mg/l | <0.25 mg/l | 10 mg/l | 2 W/cm2 | 20.5 Hrs |

EXPERIMENT # 3 - Nitrification
Results Summary Table - (see FIG. 3)

| Status | pH | DO | NH3/NH4 | NO2 | NO3 | INTENSITY | TIME |
|---|---|---|---|---|---|---|---|
| Start | 7.6 | 9.5 mg/l | 8 mg/l | 0 mg/l | 5 mg/l | 2 W/cm2 | 0 Hrs |
| Finish | 7.6 | 9.5 mg/l | 0 mg/l | <0.25 mg/l | 10 mg/l | 2 W/cm2 | 20.5 Hrs |

EXPERIMENT # 4 - Nitrification
Results Summary Table - (see FIG. 3)

| Status | pH | DO | NH3/NH4 | NO2 | NO3 | INTENSITY | TIME |
|---|---|---|---|---|---|---|---|
| Start | 7.6 | 9.5 mg/l | 250 mg/l | 0 mg/l | 5 mg/l | 2 W/cm2 | 0 Hrs |
| Finish | 7.6 | 9.0 mg/l | 0 mg/l | <0.25 mgl | >5 mg/l | 2 W/cm2 | 20 Hrs |

EXPERIMENT # 5 - Nitrification
Results Summary Table - (see FIG. 4)

| Status | pH | DO | NH3/NH4 | NO2 | NO3 | INTENSITY | TIME |
|---|---|---|---|---|---|---|---|
| Start | 7.6 | 9.5 mg/l | 4 mg/l | 0 mg/l | 5 mg/l | 1 W/cm2 | 0 Hrs |
| Finish | 7.6 | 10 mg/l | 0 mg/l | 0.25 mg/l | 10 mg/l | 1 W/cm2 | 40 Hrs |

The following observations were made as a result of the experiments:

1) For equal water volumes containing different concentrations of ammonia, the time required to reduce all such varying ammonia concentrations to zero was the same.

2) The time required to decrease a given total ammonia concentration in water to zero was inversely proportional to the applied sono-molecular-conversion intensity, (W/cm2). For example, the time necessary to bring total ammonia concentration in water to zero with an applied sono-molecular-conversion intensity of 2 W/cm2 was half that required at 1 W/cm2.

3) After, sono-molecular-conversion irradiation reduced total ammonia concentration in water to zero, the remaining residual concentrations of nitrite and nitrate remained unchanged with continuing sono-molecular-conversion irradiation. Further, at this point, even with several sequentially added ammonia concentrations being reduced to zero by sono-molecular-conversion, the residual concentrations of nitrite and nitrate showed only slight increase.

4) Following initial nitrification, the residual concentration of nitrite was 0.25 mg/L and the residual concentration of nitrate was 5 mg/L.

5) Following each sono-molecular-conversion, nitrification experiment, water pH remained virtually unchanged, i.e., the increase in pH was slight. After each sono-molecular-conversion experiment was completed, the concentration of dissolved oxygen, remained the same or showed a slight increase.

6) The above sono-molecular-conversion nitrification experiment results were independent of temperature of the water/ammonia mixture over the range applicable to fish survival, 48 to 87F.

For the above experiments, an 8.5 liter experimental tank volume contained 8,421,000 mg of water. The ammonia concentrations employed were 2 mg/l, 4 mg/l, 8 mg/l and 250 mg/l. Therefore, the corresponding weight of ammonia was 17 mg, 34 mg, 68 mg and 2125 mg, and the % weight of ammonia in tank water was 0.0002%, 0.0004% 0.0008% and 0.025%.

Water and ammonia molecules weigh the same on the chemical scale. A water molecule consists of 2 atoms of hydrogen and 1 atom of oxygen while an ammonia molecule consists of 1 atom of nitrogen and 3 atoms of hydrogen. When ammonia is added to pH 7 water, 99% of the ammonia molecules bond with the water molecules to form ammonium (NH4) ions. Ammonium ions repel one another. Ammonia (NH3) is polar and readily dissolves in water.

The end result is establishment of a widely separated 3D lattice-work of ammonium ions submerged within the experimental tank water volume. Within the experimental tank water is a seemingly endless invisible fog of micron size contaminant nucleation sites interspersed relatively evenly throughout the water volume. When ultrasonic irradiation commences, a significant number of nucleation sites will form micron size bubbles which, with each succeeding pressure wave, will grow until they finally collapse. This cavitation process is repeated over and over again while ultrasonic irradiation continues. However, since the population of ammonium ions are evenly distributed throughout the water volume, there is an equal chance that the ammonium ion population particular to each ammonia/water concentration will experience the same percentage loss of ammonium ions to nitrification at the same time.

Hence, all the above levels of ammonia/water concentrations will, as the experiment confirmed, complete the reduction of ammonia concentration to zero in the same time period as each curve is asymptotic to zero.

It was reported by O. I. Babikov in 1960, that increasing ultrasonic intensity (W/cm2) shortened the time from cavitation bubble initiation to its catastrophic collapse. More precisely, it is an increase in both the rarefactional and compressional pressure wave amplitudes that shortens the time from cavitation bubble initiation to its catastrophic collapse. Therefore, increasing the ultrasonic pressure amplitude increases the frequency of all individual microsized bubble initiation to collapse events than will occur at a lower ultrasonic pressure amplitudes. Since each ammonium ion situated adjacent to a collapsing microsized bubble undergoes the nitrification process it follows that increasing ultrasonic pressure amplitude shortens the time to reduce a given ammonia/water concentration to zero. FIG. 7, demonstrates the relationship between ultrasonic pressure amplitude and the sono-molecular-conversion-process duration, in hours, necessary to reduce all the above ammonia/water concentrations to zero.

Sono-Molecular-Conversion Mineralization

The inventor also experimented with sono-molecular-conversion of organic fish waste (uneaten fish-food) into inorganic ammonia. The fish-food/water mixtures were irradiated at an ultrasound frequency of 30 kHz at intensity settings of 2.0 and 1.0 W/cm2. The concentration of fish food was 1.1 gm/L. The water source experimented with was municipal.

FIGS. 3 and 4 and the following tables illustrate the results of the experiments.

Figure 5:
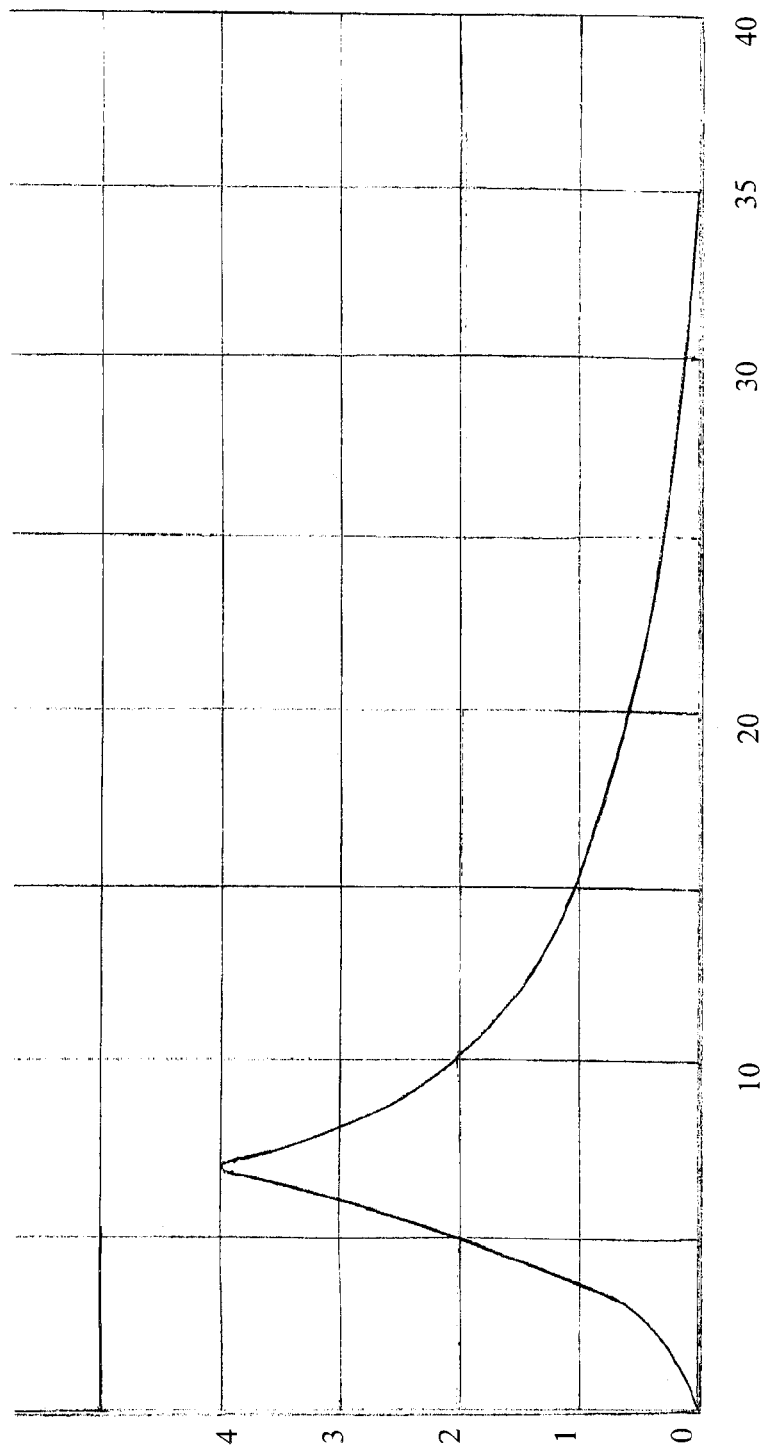

EXPERIMENT # 6 - Mineralisation
Results Summary Table (TETRAFIN flakes, 0.38 gm/l), (see FIG. 5)

|  | pH | DO | NH3/NH4 | NO2 | NO3 | INTENSITY | TIME |
|---|---|---|---|---|---|---|---|
| Denitrification | | | | | | | |
| Start | 7.4 | 9.5 mg/l | 0 mg/l | 0.25 mg/l | 5 mg/l | 2 W/cm2 | 0 Hrs |
| Finish | | | 0.5 mg/l | 0 mg/l | 0 mg/l | 2 W/cm2 | 3 Hrs |
| Mineralisation | | | | | | | |
| Start | | | 0.5 mg/l | 0 mg/l | 0 mg/l | 2 W/cm2 | 3 Hrs |
| Finish | | | 4 mg/l | 0 mg/l | 0 mg/l | 2 W/cm2 | 7 Hrs |
| Nitrification | | | | | | | |
| Start | | | 4 mg/l | 0 mg/l | 0 mg/l | 2 W/cm2 | 7 Hrs |
| Finish | 7.4 | 9.5 mg/l | 0 mg/l | 0.25 mg/l | 5 mg/l | 2 W/cm2 | 35 Hrs |

EXPERIMENT #7 - Mineralisation
Results Summary Table (CHICLID pellets, 0.38 gm/l), (see FIG. 6)

|  | pH | DO | NH3/NH4 | NO2 | NO3 | INTENSITY | TIME |
|---|---|---|---|---|---|---|---|
| Denitrification |  |  |  |  |  |  |  |
| Start | 7.4 | 9.5 mg/l | 0 mg/l | 0.25 mg/l | 5 mg/l | 2 W/cm2 | 0 Hrs |
| Finish |  |  | 1 mg/l | 0 mg/l | 0 mg/l | 2 W/cm2 | 2 Hrs |
| Mineralisation |  |  |  |  |  |  |  |
| Start |  |  | 1 mg/l | 0 mg/l | 0 mg/l | 2 W/cm2 | 2 Hrs |
| Finish |  |  | 8 mg/l | 0 mg/l | 0 mg/l | 2 W/cm2 | 9 Hrs |
| Nitrification |  |  |  |  |  |  |  |
| Start |  |  | 8 mg/l | 0 mg/l | 0 mg/l | 2 W/cm2 | 9 Hrs |
| Finish | 7.4 | 9.5 mg/l | 0 mg/l | <0.25 mg/l | 5 mg/l | 2 W/cm2 | 42 Hrs |

The inventor's experimentation demonstrated the following interrelationships applicable to sono-molecular-conversion of organic fish waste (uneaten fish-food) into inorganic ammonia.

1) For equal water volumes containing the same measure of organic matter, (fish-food), the time required to reduce organic matter to zero was the same. Zero Organic Matter Concentration was defined as the level of highest ammonia concentration converted by the mineralization process.

2) The time required to decrease a given organic matter concentration to zero (as defined in 1, above) was inversely proportional to the applied ultrasonic intensity (W/cm2). For example, the time necessary to bring organic matter concentration in water to zero with an applied ultrasonic intensity of 2.0 W/cm2 was half that required at 1.0 W/cm2.

3) Following each sono-molecular-conversion mineralization experiment, the water pH remained virtually unchanged, i.e., the increase in pH was slight. After each sono-molecular-conversion mineralization experiment was completed the concentration of dissolved oxygen remained the same or showed a slight increase.

4) Coincident with the point of peak ammonia concentration and the simultaneous reduction of carbon to zero, the nitrification process automatically resumed and continued until the ammonia was reduced to 0.0 mg/L.

Sono-Molecular-Conversion Denitrification

The inventor's experimentation, demonstrated the following interrelationships are applicable to sono-molecular-conversion denitrification and occurred concurrently with the mineralization conversion of organic matter (uneaten fish-food) to inorganic ammonia.

1) Before denitrification, the residual concentration of nitrite in water was <0.25 mg/L and the residual concentration of nitrate was 5 mg/L.

2) Very rapidly following the sono-molecular-conversion initiation of the mineralization process, the above nitrite and nitrate concentrations within the aqueous medium were converted to inert dinitrogen gas (N2) and released from the water to atmosphere.

3) Thereafter, nitrite and nitrate concentration remained at 0.0 mg/L throughout the mineralization process, i.e., until the concentration of carbon was exhausted and ammonia concentration had peaked.

4) For equal water volumes containing the same measure of organic matter (uneaten fish-food), the time required to decrease a given residual concentration of nitrite and nitrate to zero was the same.

5) The time required to decrease a given concentration of nitrite and nitrate to zero was inversely proportional to applied sono-molecular-conversion intensity (W/cm2).

For example, the time necessary to bring nitrite and nitrate concentration in water to zero with a sono-molecular-conversion intensity of 2.0 W/cm2 was half the time required at 1.0 W/cm2.

6) Following each sono-molecular-conversion denitrification experiment, the water pH remained virtually unchanged, i.e., the increase in pH was slight. After each sono-molecular-conversion denitrification experiment was completed, the concentration of dissolved oxygen remained unchanged or showed a slight increase.

Sono-Molecular-Conversion Nitrification/Mineralization/Denitrification

Each of the above water/contaminate mixture experiments were conducted separately using discrete but varying measures of ammonia (NH3) and organic fish food.

Nitrification—For example, several separate concentrations of NH3 were added to the same, but separate volumes of water. Such mixtures were irradiated at specific sono-molecular-conversion intensities (W/cm2) and with 30 kHz ultrasound to create continuous transient cavitation within the mixture until the NH4/NH3 concentration was reduced to 0.0 mg/L.

Mineralization—Similarly, several concentrations of organic fish-food were added to the same, but separate volumes of water. Such mixtures were irradiated at specific sono-molecular-conversion intensities (W/cm2) and with 30 kHz ultrasound to create continuous transient cavitation within the mixtures until the organic (carbon) matter was fully converted into inorganic matter as indicated by the maximum concentration of ammonia converted.

Denitrification—Concurrent with the reduction of organic matter into inorganic matter (mineralization) it was observed that residual concentrations of nitrite (NO2) and nitrate (NO3) existing in the water volumes before commencement of the mineralization experiment were rapidly reduced to 0.0 mg/L and remained so throughout the mineralisation conversion of organic matter to inorganic matter.

In the invention's preferred embodiment, the above separate experiment objectives are combinable and function together as one continuous 24/7 synergistic sono-molecular-conversion process to secure the above nitrification, mineralization and denitrification objectives.

In practice, the sono-molecular-conversion intensity (W/cm2), is variably adjusted to the rate of ammonia concentration generated in a given aquaculture tank volume by the quantity of fish contained therein and the quantity of fish-food employed. That is, the sono-molecular-conversion intensity is adjusted in amplitude to reduce ammonia concentration at a rate equal to, or greater than, the combined rate at which the fish gill/urine, fish-food and fish faeces are generating ammonia.

The prime-mover for sono-molecular-conversion (SMCP), in the aqueous medium is the presence of negative and positive alternating pressure waves which create micro-sized vapor-bubbles which, commensurate with the applied sono-molecular-conversion frequency, collapse upon reaching resonant size by a phenomenon known as transient cavitation. In the fish aquaculture SMCP application, frequencies of interest extend over the ultrasonic range 20 to 60 kHz with 30 kHz being the frequency of choice.

The range for the sono-molecular-conversion intensity setting is adjustable from zero to 10 W/cm2, (zero to 387 kPa) which corresponds to safe ammonia concentration reduction rate for fish cultured at a density of 5 lb/cu ft and estimated un-eaten feed of 1 gm/L.

The preferred ammonia detoxification apparatus for the Recirculating Aquaculture System illustrated by U.S. patent application Ser. Nos. 10/676,061, 10/912,608 and 11/042,607 is incorporated herein by reference, and is the same apparatus used herein. However, the invention's SMCP technology is applicable as a "stand alone" ammonia detoxification device for existing RAS, as well as for integration with municipal and industrial organic waste reduction/conversion applications.

Although the invention has been described in terms of particular embodiments and applications, one of ordinary skill in the art, in the light of this teaching, can generate additional embodiments and modifications without departing from the spirit of or exceeding the scope of the claimed invention. Accordingly, it is to be understood that the drawings and the descriptions herein proffered by way of example to facilitate comprehension of the invention and should not be construed to limit the scope thereof.

What is claimed is:

1. A sono-molecular-conversion method for effecting nitrification of ammonia in recirculating aquaculture tanks, the method comprising:
    isolating a portion of water in a fish tank water from fish in the tank;
    applying ultrasonic energy to the isolated water to ultrasonically collapse microsized bubbles with transient cavitation in said isolated fish tank water to effect nitrification of ammonia therein by sono-molecular-conversion.

2. The method according to claim 1, further comprising controlling, either manually or automatically, a duration of the sono-molecular-conversion process, whereby the time of sono-molecular-conversion can be increased or decreased to match or exceed a concentration of ammonia.

3. The method according to claim 1, further comprising monitoring ammonia levels in the fish tank water containing the fish and in the isolated water.

4. The method according to claim 1, further comprising subsequently mixing the ultrasonically treated portion of fish tank water with an ultrasonically untreated portion of the fish tank water.

5. A sono-molecular-conversion method for effecting mineralization of ammonia in recirculating aquaculture tanks, the method comprising:
    isolating a portion of water in a fish tank water from fish in the tank;
    applying ultrasonic energy to the isolated water to ultrasonically collapse microsized bubbles with transient cavitation in said isolated fish tank water to effect conversion of organic matter into ammonia therein by sono-molecular-conversion.

6. The method according to claim 5, further comprising controlling, either manually or automatically, a duration of the sono-molecular-conversion process, whereby the time of sono-molecular-conversion can be increased or decreased to match or exceed a concentration of organic matter therein.

7. The method according to claim 5, further comprising monitoring carbon levels in the fish tank water containing the fish and in the isolated water.

8. The method according to claim 5, further comprising subsequently mixing the ultrasonically treated portion of fish tank water with an ultrasonically untreated portion of the fish tank water.

9. A sono-molecular-conversion method for effecting denitrification of nitrite and nitrate using organic matter in recirculating aquaculture tanks, the method comprising:
    isolating a portion of water in a fish tank water from fish in the tank;
    applying ultrasonic energy to the isolated water to ultrasonically collapse microsized bubbles with transient cavitation in said isolated fish tank water to effect elimination of nitrite and nitrate during the mineralization of organic (carbon) matter therein by sono-molecular-conversion.

10. The method according to claim 9, further comprising controlling, either manually or automatically, a duration of the sono-molecular-conversion process, whereby the time of sono-molecular-conversion can be increased or decreased to match or exceed a concentration of nitrite and nitrate.

11. The method according to claim 9, further comprising monitoring nitrite and nitrate in the fish tank water containing the fish and in the isolated water.

12. The method according to claim 9, further comprising subsequently mixing the ultrasonically treated portion of fish tank water with an ultrasonically untreated portion of the fish tank water.

13. A method for removal of a contaminant caused by the presence of fish, uneaten organic fish-food particulate and carbon content in a recirculating aquaculture fish tank, the method comprising:
    monitoring the contaminant levels in fish tank water;
    upon detecting a predetermined level of the contaminant, removing fish from at least a portion of the fish tank water to thereby isolate said portion of the fish tank water;
    ultrasonically generating transient cavitation bubbles in the isolated portion of the fish tank water to create sono-molecular-conversion of the contaminant therein; and
    subsequently mixing the ultrasonically treated portion of fish tank water with an ultrasonically untreated portion of the fish tank water.

14. The method according to claim 13, wherein the contaminant is ammonia.

15. The method according to claim 13, wherein the contaminant is carbon.

16. The method according to claim 13, wherein the contaminant is nitrite and nitrate.

17. The method according to claim 13, further comprising directing the portion of the fish tank water through a screen-filter.

18. The method according to claim 17, wherein the directing of the portion of the fish tank water through a screen-filter is undertaken after generating the transient cavitation bubbles in the portion of the fish tank water.

19. A method for removal of a contaminant caused by the presence of fish, uneaten organic fish-food particulate and carbon content in a recirculating aquaculture fish tank, the method comprising:
monitoring the contaminant levels in fish tank water;
applying ultrasonic energy to generate transient cavitation bubbles in the fish tank water to create sono-molecular-conversion of the contaminant therein; and
adjusting an intensity of the ultrasonic energy to a level corresponding to the contaminant levels.

20. The method according to claim 19, wherein the method further includes continually or periodically monitoring the contaminant levels and automatically adjusting the intensity of the ultrasonic energy in response to changes in the contaminant levels.

21. The method according to claim 19, wherein the contaminant is ammonia.

22. The method according to claim 19, wherein the contaminant is carbon.

23. The method according to claim 19, wherein the contaminant is nitrite and nitrate.

24. A method for reducing ammonia concentrations caused by the presence of fish faeces and un-eaten fish feed particulate matter in recirculating aquaculture tanks, comprising:
monitoring ammonia levels in fish tank water;
upon detecting a predetermined ammonia concentration in the fish tank water, removing fish from at least a portion of the fish tank water to thereby isolate said portion of the fish tank water;
ultrasonically generating transient cavitation bubbles in the isolated portion of the fish tank water to oxidize ammonia therein; and
subsequently mixing the ultrasonically treated portion of fish tank water with an ultrasonically untreated portion of the fish tank water.

25. The method defined in claim 24, further comprising directing the isolated portion of fish tank water through a screen filter.

26. The method defined in claim 25 wherein the directing of the isolated portion of fish tank water through a screen filter is undertaken after the generating of transient cavitation bubbles in the isolated portion of the fish tank water.

* * * * *

UNITED STATES PATENT AND TRADEMARK OFFICE
CERTIFICATE OF CORRECTION

| | |
|---|---|
| PATENT NO. | : 7,624,703 B2 |
| APPLICATION NO. | : 11/534008 |
| DATED | : December 1, 2009 |
| INVENTOR(S) | : Robert Edward Vago |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 570 days.

Signed and Sealed this

Twenty-sixth Day of October, 2010

David J. Kappos
*Director of the United States Patent and Trademark Office*